US012636770B2

(12) United States Patent
Patoux

(10) Patent No.: US 12,636,770 B2
(45) Date of Patent: May 26, 2026

(54) RACK SYSTEM, ROLLING PLANT INCLUDING SUCH A SYSTEM AND METHOD IMPLEMENTED BY SUCH A SYSTEM

(71) Applicant: FIVES DMS, Lezennes (FR)

(72) Inventor: Vincent Patoux, Lezennes (FR)

(73) Assignee: FIVES DMS, Lezennes (FR)

(*) Notice: Subject to any disclaimer, the term of this patent is extended or adjusted under 35 U.S.C. 154(b) by 330 days.

(21) Appl. No.: 18/435,426

(22) Filed: Feb. 7, 2024

(65) Prior Publication Data

US 2024/0261959 A1 Aug. 8, 2024

(30) Foreign Application Priority Data

Feb. 8, 2023 (FR) ....................................... 2301181

(51) Int. Cl.
*B25H 3/04* (2006.01)
*B21B 31/08* (2006.01)

(52) U.S. Cl.
CPC ............... *B25H 3/04* (2013.01); *B21B 31/08* (2013.01)

(58) Field of Classification Search
CPC ....... B21B 31/08; B21B 31/10; B21B 31/103; B21B 31/12; B25H 3/04; B66F 7/00; B66F 9/065
See application file for complete search history.

(56) References Cited

U.S. PATENT DOCUMENTS

| | | | | |
|---|---|---|---|---|
| 5,193,377 | A | 3/1993 | Sendzimir et al. | |
| 5,471,859 | A | 12/1995 | Sendzimir et al. | |
| 6,253,593 | B1 * | 7/2001 | Goto | B21B 31/08 72/97 |
| 2002/0070309 | A1 * | 6/2002 | Stauber | B65H 5/28 242/559.3 |

FOREIGN PATENT DOCUMENTS

| | | | | |
|---|---|---|---|---|
| CN | 109179264 A * | 1/2019 | B66F 9/065 |
| DE | 19533582 A1 | 3/1997 | |
| DE | 102009037665 A1 | 2/2011 | |
| JP | H05317930 A | 12/1993 | |
| WO | WO-2007134840 A1 * | 11/2007 | B65G 1/1378 |
| WO | 2022223927 A1 | 10/2022 | |
| WO | 2022229327 A1 | 11/2022 | |

OTHER PUBLICATIONS

Search Report and Written Opinion issued on Sep. 14, 2023, in corresponding French Application No. 2301181 10 pages (No English Translation Available).

* cited by examiner

*Primary Examiner* — Saul Rodriguez
(74) *Attorney, Agent, or Firm* — Maier & Maier, PLLC

(57) ABSTRACT

A rack system (SR) for the storage of rolls of a rolling mill including a support frame (Cha) configured to support several racks (Rac), distributed over the length of the support frame at different positions along the length of the rack, at least one first rack (Ra1) and one second rack (Ra2) configured to rest while bearing on the support frame (Cha). The first rack (Ra1) is configured to pass from a storage position (PS) for which said first rack (Rac1) rests bearing simultaneously on a first support (Cha1) and a second support (Ch2) of the support frame (Cha) up to a transport position (PT) for which the first rack (Rac1) is configured to be stowed in the free clearance (IT) below the level of the (Continued)

second rack (Rac2) resting on said support frame (Cha) at an intermediate position.

10 Claims, 8 Drawing Sheets

RACK SYSTEM, ROLLING PLANT INCLUDING SUCH A SYSTEM AND METHOD IMPLEMENTED BY SUCH A SYSTEM

FIELD

The present disclosure relates to a rack system, as well as a rolling plant comprising such a rack system.

The present disclosure also relates to a method for evacuating worn rolls, implemented by a rack system according to the present disclosure.

The present disclosure also relates to a method for feeding new or rectified rolls, implemented by a rack system according to the present disclosure.

BACKGROUND

More particularly, the field of the invention relates to equipment used to perform maintenance operations on a 20-high type rolling mill. For example, a 20-high rolling mill is known from the prior documents U.S. Pat. Nos. 5,193,377 and 5,471,859. In such a rolling mill, the rolls (and sets of backup rollers) are distributed into a lower group $G_I$ and an upper group $G_S$, and according to a symmetric configuration with respect to a running plane of the metal strip to be rolled. For example, FIG. 5 of the document U.S. Pat. No. 5,193,377 illustrates the upper group with a work roll, two first intermediate rolls, three second intermediate rolls, and four sets of backup rollers.

As rolling campaigns are carried out, it is necessary to renew the surface condition of the rolls of the rolling mill, this operation being performed by opening the access door of the roll stand and by removing the rolls from the roll stand. Afterwards, these rolls are rectified, before being inserted again into the roll stand.

Typically, each set of backup rollers comprises a support shaft along which rollers are distributed formed typically by bearings. To this end, the inner race of each bearing is mounted on the support shaft, the outer race of the bearing being intended to run over one, and possibly two contiguous rolls belonging to the second intermediate rolls. All of the backup rollers also comprise a saddle whose arcuate body extends longitudinally over the length of the support shaft, and whose convex face is intended to bear on a concave seat of a mounting portion of the roll stand. This saddle also has extensions, projecting from the concave face of the body, crossed by the support shaft, the extensions being distributed over the length of the shaft and in particular disposed between the rollers. Eccentric rings are also provided between the support shaft and these extensions, the shaft having a pinion intended to mesh in the roll stand with a corresponding pinion, or a rack. Thus, this pinion (or this rack) allows driving the support shaft in rotation, and thus bringing the position of the support shaft and of the carried rollers away from or close to the arcuate body of the saddle, thanks to the eccentric rings. Of course, these sets of backup rollers also require maintenance, which is performed by removing this member from the roll stand, along the axis of said support shaft.

The operations of extraction (or setup by insertion) of the internal members, (rolls or sets of backup rollers) are usually performed thanks to a piece of handling equipment secured to the end of the member to be removed (namely to the end of the roll to be removed or of the support shaft of the set of backup rollers to be removed), provided with a counterweight. The counterweight is intended to balance the member to be grasped when handled by the hoist of a bridge crane of the workshop, and in order to keep it substantially horizontal, and while the hook of the hoist grasps a lifting eye positioned on the equipment between the counterweight and the grasped member. During the extraction of the member (or conversely during its setup), the grasped member is rigidly secured to the counterweight of the equipment, which might swing at the lower end of the rope of the hoist.

During the extraction manoeuvres, the operators are necessarily present proximate to the grasped member, in order to guide the extraction (or setup) operations which are thus particularly dangerous because of the possible swinging movements of the heavy elements hanging from the robe of the bridge crane.

Nonetheless, robotic systems are known from the prior art, in particular that one disclosed by the document WO 2022/229327 A1 of the present Applicant, illustrated in FIGS. 1 and 2.

Thus, said rolling mill has a roll stand and a set of rolls, internal to the roll stand, including two work rolls 12, backup rolls or backup rollers A, B, C, D, E, F, G, H, and possibly intermediate rolls in particular first intermediate rolls 13 and second intermediate rolls 14, 15, the roll stand having an access opening, possibly closed by a door system. In FIGS. 1 and 2, the metal strip Bm extends longitudinally along a horizontal direction X, and transversely according to a horizontal direction Y, the direction Y being parallel to the axes of the rolls of the rolling mill.

Said plant comprises a robotic system 1 suited to ensure the operations of replacing rolls of the rolling mill, by extraction of the worn rolls from the roll stand and/or by insertion of new (or rectified) rolls into the roll stand, said robotic system having a robot Ro comprising:

- a carriage comprising a frame 2 provided with wheels cooperating with rails Ra1 disposed on the ground, extending along the direction Y, in line with the access opening of the roll stand, said frame being configured to move along the direction Y along the rails Ra1, and
- a grasping system 6, configured to control locking and unlocking of grasping of an endpiece Eb secured to a roll, or grasping of an endpiece of a gripping system of a roll of the rolling mill.

The rolling plant also comprises a rack system comprising a support frame Cha, supporting removable racks Rac.

The support frame is fastened to the ground at an anchor position at a distance from the rolling mill according to the transverse direction Y and laterally to the rails Ra1, the position of the support frame clearing a maintenance aisle AL along the direction X, along the access opening of the rolling mill.

The support frame Cha comprises a first support Cha1, and a second support Cha2 on which each of the racks Rac rests and the first support and the second support being oriented lengthwise along the transverse direction Y.

The robotic system 1 is configured to ensure the extraction of a worn roll, by grasping the endpiece secured to the roll, or else by grasping the roll by the locked gripping system by the grasping system, with deposition of the roll, laterally to the rails Ra1, on the first rack bearing on the support frame Cha. Conversely, the robotic system can grasp a new work roll, disposed beforehand on the rack, and in order to insert it into the roll stand.

In particular, the rack full with worn rolls can be evacuated by automated guided vehicles, by accessing the free clearance from the distal end of the rack, the farthest from the roll stand.

According to the observations of the Applicant, such a rolling plant comprising in particular such a robotic system and such a rack system is satisfactory, but still imposes a considerable activity of the automated guided vehicles to feed or extract the racks on the support frame.

In particular, when several removable racks are arranged on the support frame, the automated guided vehicle cannot access the rack the closest to the rolling mill, without having removed beforehand the racks located between this rack, the closest to the rolling mill, on the one hand, and the access opening for the automated guided vehicle, on the other hand, this opening being located at the level of the distal end of the rack, the farthest from the roll stand.

In case of lack of capacity of the automated guided vehicles, the removal of the racks is done, because of a lack of time, only at the level of the distal section of the rack, the farthest from the roll stand, and not at the level of the proximal section, the closest to the roll stand. Only the racks arranged on the distal section can be extracted/fed which results in increasing the distance covered by the robot from the cage to deposit or recover a roll on the rack, and therefore increasing the maintenance cycle time, with a considerable increase in the duration of suspension of the rolling operations of the rolling plant.

SUMMARY

The present invention aims to improve the situation.

According to a first premier aspect, a rack system for the storage of rolls of a rolling mill is provided comprising:

- a support frame configured to support several racks, distributed over the length of the support frame at different positions along the length of the rack, the support frame comprising a first support, and a second support, respectively fastened to the ground in parallel, the first support and the second support leaving a free clearance therebetween, arranged below the level of the racks bearing on the support frame,
- at least one first rack and one second rack configured to rest by bearing on the support frame Cha, by resting simultaneously on the first support and the second support, at two opposite edges of the first rack at two positions over the length of the first rack and at two opposite edges of the second rack at two positions over the length of the second rack, said second rack arranged at an intermediate position on said support frame along the length of the support frame.

According to said rack system according to the present disclosure:

- at least said first rack is configured to pass from a storage position for which said first rack rests bearing simultaneously on the first support and the second support up to a transport position for which the first rack is configured to be stowed in the free clearance, below the level of the second rack resting on said support frame at the intermediate position,
- a motor-driven handling system, is configured to move in said free clearance between the first support and the second support, said handling system comprising:
- a frame provided with drive means configured to circulate between the first support and the second support, along the length of the support frame,
- lifting means configured to ensure the support of at least the first rack in said transport position,
- and wherein said handling system is configured to ensure, starting from said storage position of the first rack simultaneously bearing on the first support and the second support:
- /a/a passage of the first rack into said transport position of the first rack, enabling stowage thereof in the free clearance,
- /b/a descent of the first rack in the free clearance between the first support and the second support, in a lowered position below the level of the second rack resting on the support frame at said intermediate position, and
- /c/a joint movement of the handling system and of said first rack supported by the lifting means in the lowered position of the first rack, through a movement of the handling system along the length of the frame so as to move the first rack below the second rack resting on the support frame at said intermediate position starting from a first side of the second rack and up to an opposite second side.

According to features of the present disclosure, considered separately or in combination:

- the support frame comprises first support portions, projecting from the first support and from the second support directed inwardly of the free clearance, the first support portions locally distributed along the length of the support frame and wherein the first rack comprises second support portions, projecting from the first rack outwardly, the second support portions locally distributed along a dimension of the first rack and wherein said storage position is obtained by pressing the second projecting portions of the first rack on the first projecting portions of the support frame, and wherein said transport position is obtained by lifting the first rack from the storage position and through a movement of the first rack along the frame by the lifting means of the handling system so as to shift the vertical alignment between the second support portion and the first support portions.
- the rack system includes a plurality of pairs of first projecting portions along the length of the support frame, enabling support of the first rack in said storage position, at several discontinuous positions along the length of the support frame.
- the drive means comprise means for trolleying the handling system comprising rails, arranged along the length of the free clearance and wheels of the frame configured to circulate along the rails while being guided by the rails.
- the lifting means comprise a scissor lift.
- said at least one first rack supports rolling work rolls, for example, preferably the rolls being parallel, oriented for example perpendicularly to the longitudinal direction of the support frame.

According to a second aspect, the present disclosure relates to a plant for rolling a metal strip comprising a rolling mill, and a rack system according to the present disclosure, said rolling mill having a roll stand and a set of rolls, internal to the roll stand, including two work rolls, backup rolls or backup rollers, and possibly intermediate rolls in particular first intermediate rolls and second intermediate rolls, the roll stand having an access opening, possibly closed by a door system, the metal strip extending longitudinally along a horizontal direction X, and transversely according to a horizontal direction Y, the direction Y being parallel to the axes of the rolls of the rolling mill,

- said plant comprising a robotic system suited to ensure the operations of replacement of rolls of the rolling mill, by extraction of the worn rolls from the roll stand and/or insertion of new or rectified rolls into the roll stand, said robotic system comprising a robot comprising:

a carriage comprising a frame provided with wheels cooperating with rails disposed on the ground, extending along the direction Y, in line with the access opening of the roll stand, said frame being configured to move along the direction Y along the rails Ra1, and a grasping system configured to control locking and unlocking of grasping of an endpiece secured to a roll, or grasping of an endpiece of a gripping system of a roll of the rolling mill, and wherein said support frame is fastened to the ground at an anchor position at a distance from the rolling mill according to the transverse direction Y and laterally to the rails, clearing a maintenance aisle along the direction X, along the access opening of the rolling mill, the support frame including the first support, the second support and the free clearance IT oriented lengthwise along the transverse direction;

and wherein the robotic system is configured to ensure the extraction of a roll, by grasping the endpiece secured to the roll, or by grasping the roll by the locked gripping system by the grasping system, with the deposition of the roll, laterally to the rails, on the first rack bearing on the support frame, over a proximal section of the length of the support frame, opposite to a distal section of the length of the support frame and wherein the handling system is configured to ensure, starting from said storage position of the first rack simultaneously bearing on the first support and the second support, the first rack bearing on the proximal section:

/a/the passage of the first rack into said transport position of the first rack, enabling stowage thereof in the free clearance, /b/the descent of the first rack in the free clearance between the first support and the second support, in a lowered position below the level of the second rack resting on the support frame at said intermediate position, and /c/the joint movement of the handling system and of said first rack supported by the lifting means in the lowered position of the first rack, through a movement of the handling system along the length of the support frame so as to move the first rack below the second rack resting at said intermediate position, starting from the first side of the second rack and up to an opposite second side, /d/the rise of the first rack above the free clearance, /e/the passage of the first rack from the transport position of the first rack up to a second storage position the first rack resting on the frame, on the distal section of the frame, opposite to the proximal section of the frame.

According to one embodiment, said plant comprises an automated guided vehicle configured to be inserted into the free clearance between the first support and the second support at the distal section of the support frame, the automated guided vehicle configured to remove or feed the support frame with racks, including extracting the first rack resting in said second storage position.

According to a third aspect, the present disclosure relates to method for evacuating worn rolls implemented by a rack system according to the present disclosure, or belonging to a plant according to the present disclosure, the first rack carrying worn work rolls resting on the support frame, over a proximal section of the length of the support frame close to a roll stand, opposite to a distal section of the length of the support frame, and wherein the handling system is configured to ensure, starting from said storage position of the first rack simultaneously bearing on the first support and the second support, the first rack bearing on the proximal length section, the following steps:

/a/passage of the first rack into said transport position of the first rack, enabling stowage thereof in the free clearance, /b/descent of the first rack in the free clearance between the first support and the second support, in a lowered position below the level of the second rack resting on the support frame at said intermediate position, and /c/joint movement of the handling system and of said first rack supported by the lifting means in the lowered position of the first rack, through a movement of the handling system along the length of the support frame so as to move the first rack, below the second rack resting at said intermediate position, starting from a first side of the second rack and up to an opposite second side, /d/rise of the frame above the free clearance, /e/passage of the first rack from the transport position of the first rack up to a second storage position the first rack resting on the frame, on the distal section opposite to the proximal section of the frame, and wherein the first rack is evacuated from the distal section of the support frame, in particular by an automated guided vehicle.

According to a fourth aspect, the present disclosure relates to a method for feeding new or rectified rolls implemented by a rack system according to the present disclosure, or belonging to a plant according to the present disclosure, wherein a distal section of the length of the support frame, opposite to a proximal section of the length of the support frame, close to a roll stand, is fed with a first rack carrying new or rectified work rolls, and wherein the handling system is configured to ensure, starting from a storage position of the first rack simultaneously bearing on the first support and the second support, said first rack bearing on the distal section, the following steps:

passage of the first rack into said transport position of the first rack, enabling stowage thereof in the free clearance, descent of the first support in the free clearance between the first support and the second support, in a lowered position below the level of the second rack resting on the support frame at said intermediate position, and joint movement of the handling system and of said first rack supported by the lifting means in the lowered position, through a movement of the handling system along the length of the support frame so as to move the first rack, below the second rack resting at said intermediate position, starting from a first side of the second rack and up to an opposite second side, rise of the first rack above the free clearance, passage of the first rack from the transport position of the first rack up to a second storage position, the first rack resting on the support frame, on the proximal section, opposite to the distal section of the support frame.

BRIEF DESCRIPTION OF THE DRAWINGS

Other features, details and advantages will appear upon reading the detailed description hereinafter, and analysing the appended drawings, wherein.

a rolling mill comprising rolls, including two work rolls ensuring rolling of a metal strip running along the direction X, and in the axis of a maintenance hatch of the roll stand, a robotic system circulating on rails along a direction Y suited for the replacement of the rolls of the rolling mill, a rack system comprising a support frame, disposed at a distance from the rolling mill while leaving a maintenance aisle clear, between the rack system and the roll stand, the maintenance aisle oriented along the direction X, parallel to the metal strip, the rack system comprising a support frame anchored to the ground, laterally to the rails of the robotic system, the support frame oriented lengthwise parallel to the rail, comprising a first support and a second support parallel to one another, over which a plurality of racks are arranged, successively disposed along the length of the support frame, each simultaneously bearing on the first and second supports, and wherein the robotic system is configured to extract a worn roll from the roll stand and deposit it laterally on one of the racks, and to grasp a new (or rectified) roll disposed beforehand on a rack and insert it as a replacement in the roll stand.

Figure 1:
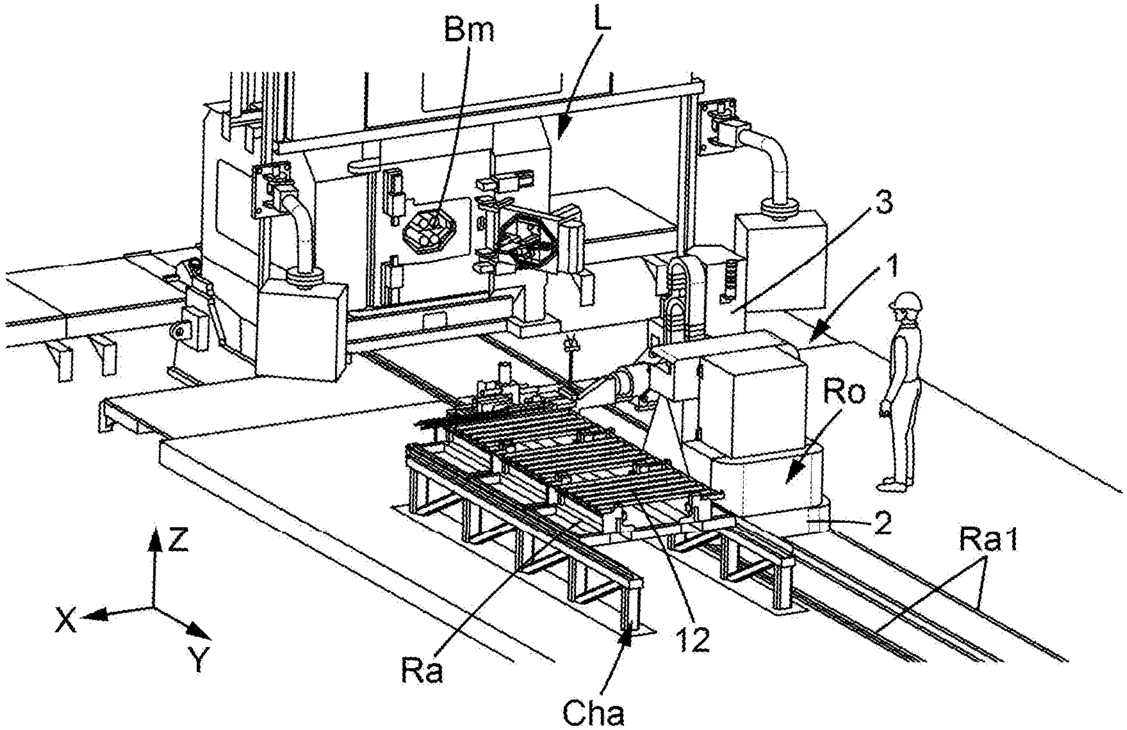
FIG. 1 is a view of a rolling plant according to the prior art comprising.
Figure 2:
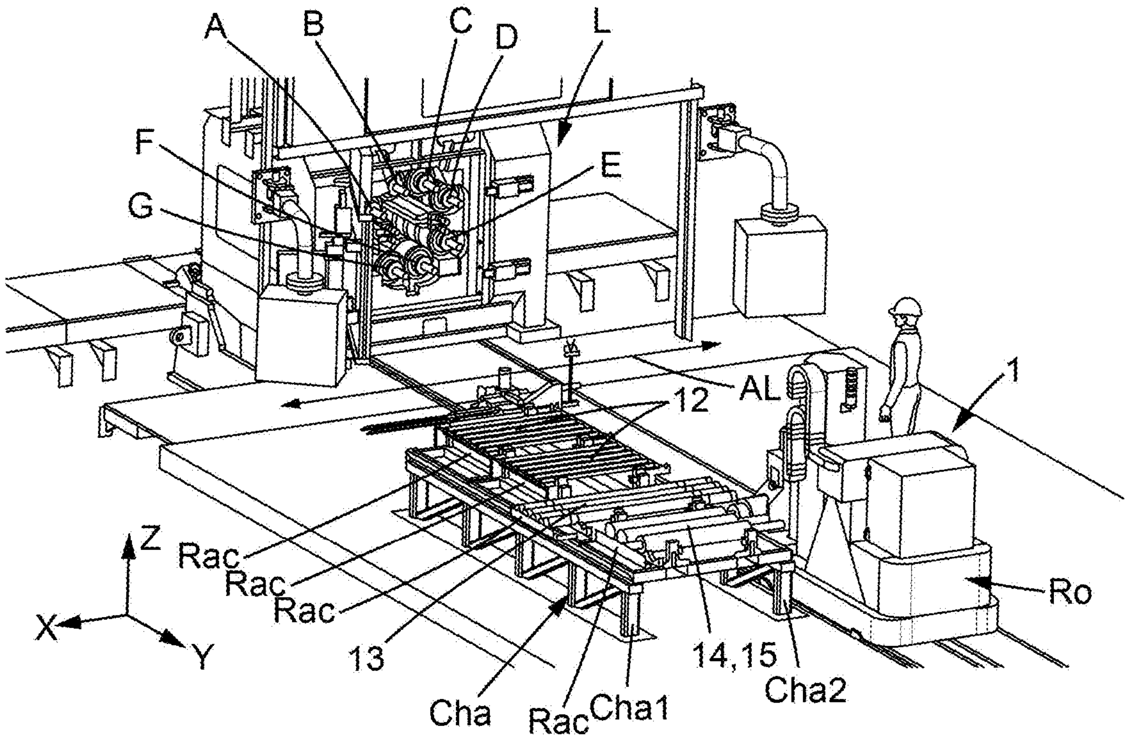

FIG. 2 is a view according to FIG. 1, for which the racks comprising, on or proximate to a proximal section of the support frame close to the roll stand, two racks supporting work rolls, and on or proximate to a distal section of the support frame, opposite to a proximal section of the support frame, two racks with a larger dimension supporting first intermediate rolls and second intermediate rolls, the two supports, the first support and the second support, leaving therebetween a free clearance for an automated guided vehicle circulating in the workshop, the automated guided vehicle configured to evacuate the racks supporting work rolls from the support frame, or on the contrary feed the frame with racks supporting new rolls.

Figure 3:
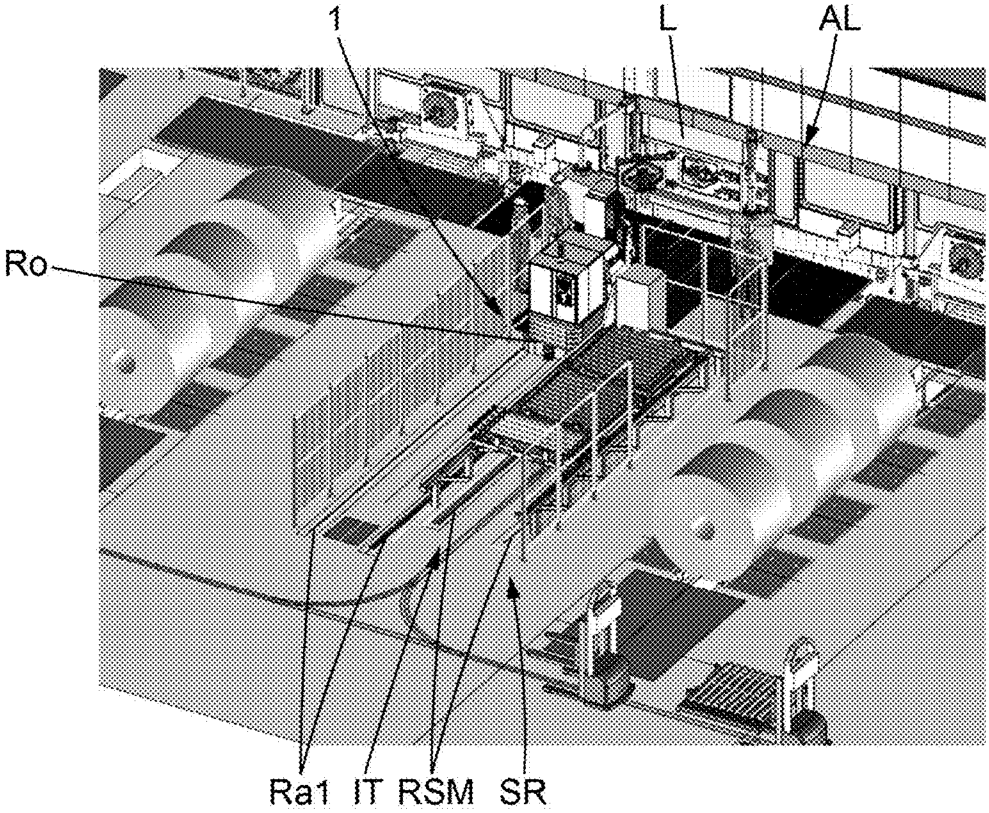

FIG. 3 is a view of a plant according to the present disclosure comprising:

a rolling mill comprising rolls, including two work rolls ensuring rolling of a metal strip running along the direction X, the rolls disposed in the axis of a maintenance hatch of the roll stand, a robotic system circulating on rails along a direction Y suited for the replacement of the rolls of the rolling mill, a rack system comprising a support frame, disposed at a distance from the rolling mill while leaving a maintenance aisle clear, between the rack system and the roll stand, the maintenance aisle along the direction X, parallel to the metal strip, the rack system comprising a support frame anchored to the ground, laterally to the rails of the robotic system, the support frame oriented lengthwise parallel to the rail, comprising a first support and a second support disposed in parallel, over which a plurality of racks are arranged, successively disposed along the length of the support frame, each simultaneously bearing on the first and second supports, and wherein the robotic system is configured to extract a worn roll from the roll stand and deposit it laterally on one of the racks, and to grasp a new (or rectified) roll disposed beforehand on a rack and insert it as a replacement in the roll stand.

Figure 4:
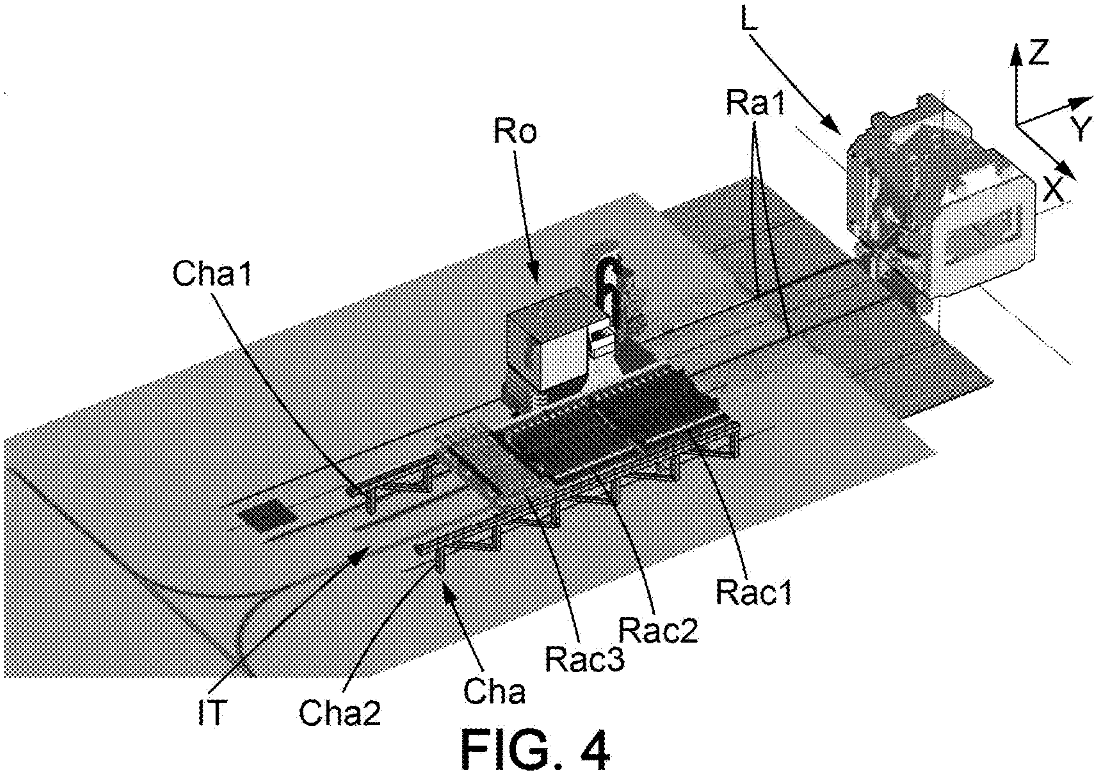

FIG. 4 is a partial view according to FIG. 3.

Figure 5:
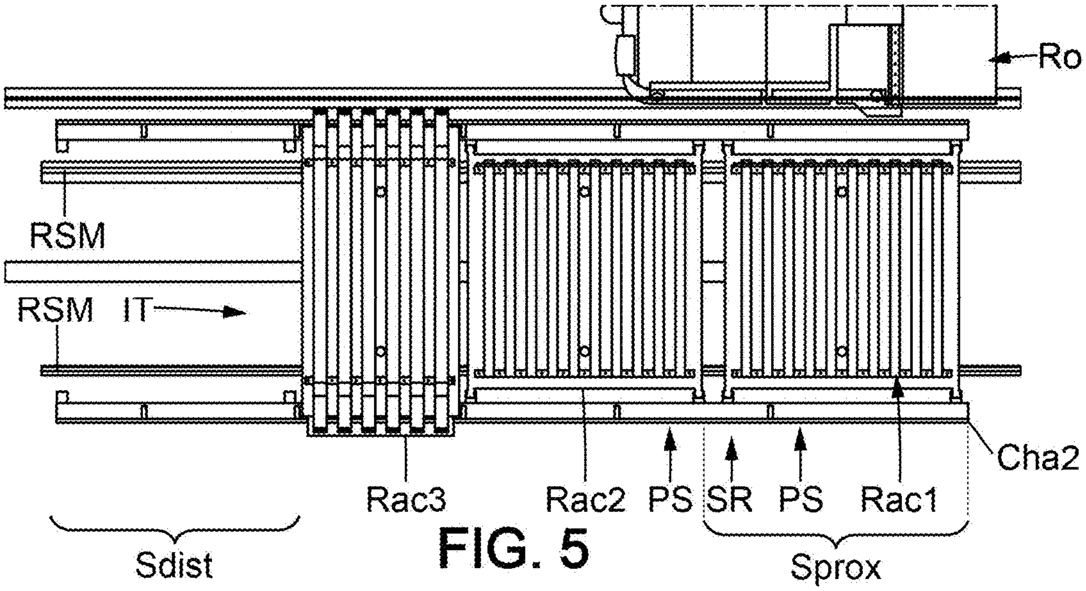

FIG. 5 is a top view of the rack system which extends, starting from the left, from the distal section, up to the proximal section of the support frame, to the right, the support frame having no rack at the distal section, to the left, supporting from the right to the left, simultaneously bearing on the first support and the second support:

a first rack receiving work rolls at the proximal section of the support frame, a second rack receiving work rolls, at an intermediate position on the support frame between the distal section and the proximal section, a third rack, with a larger dimension along a direction transverse to the support frame, receiving first intermediate rolls, at another intermediate position on the support frame.

Figure 6A:
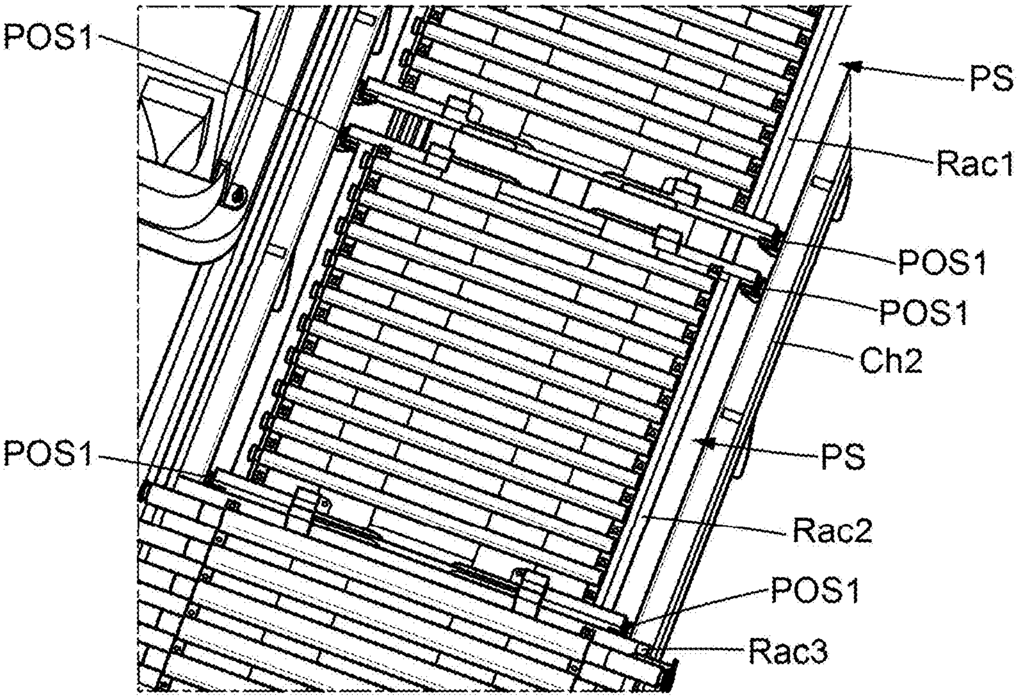

FIG. 6*a* is a detail view, of the cooperation between the support frame, on the one hand, and the first rack and the second rack, on the other hand, the support frame comprising in particular first support portions, projecting from the first support and projecting from the second support directed inwardly of the free clearance, the first support portions locally distributed along the length of the support frame and wherein the first rack comprises second support portions projecting from the first rack outwardly, the second support portions locally distributed along a dimension of the first rack and wherein said storage position is obtained by pressing the second projecting portions of the first rack on the first projecting portions of the support frame, and wherein a transport position is obtained by lifting the first rack from the storage position and through a movement of the first rack along the frame, by the handling system so as to shift the vertical alignment between the second support portion and the first support portions, and so as to enable the descent of the first rack in the free clearance.

Figure 6B:
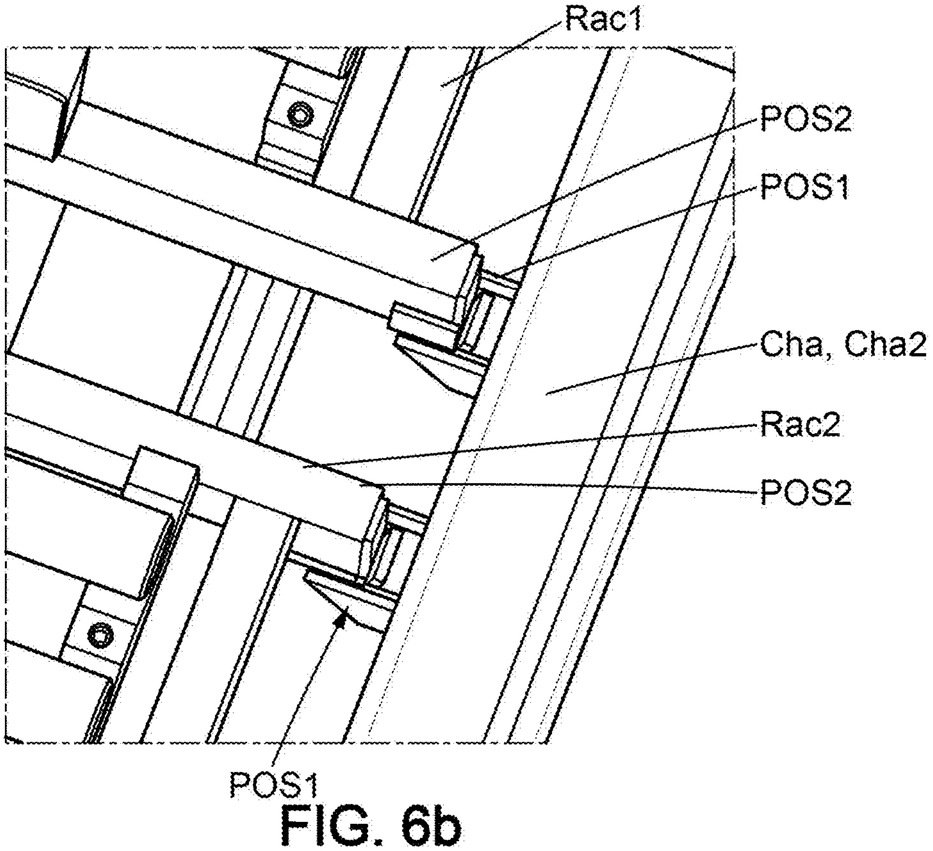

FIG. 6*b* is a detail view of FIG. 6*a*.

Figure 7A:
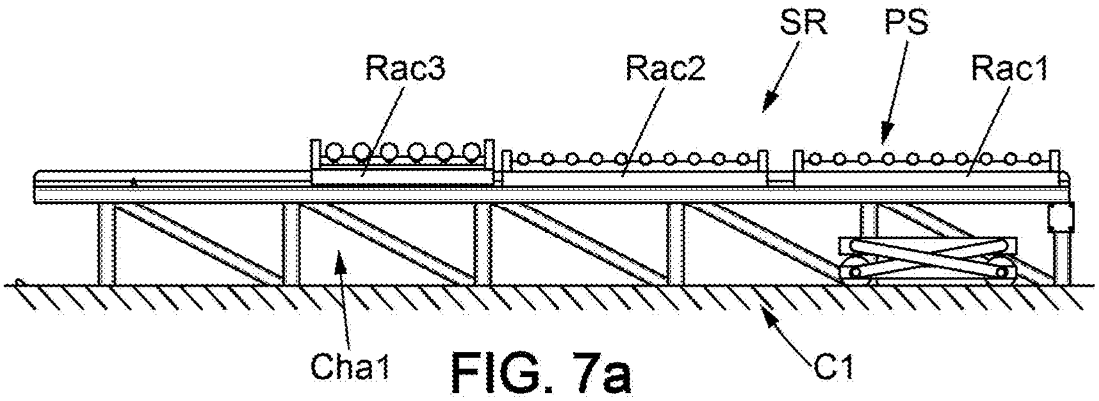

FIG. 7*a* is a side view of the rack system illustrating a first image of a method for evacuating the first rack receiving worn work rolls, the first rack resting on the support frame, at the proximal section of the support frame, the view illustrating in particular a position of a motor-driven handling system, in the intermediate clearance below the first rack.

Figure 7B:
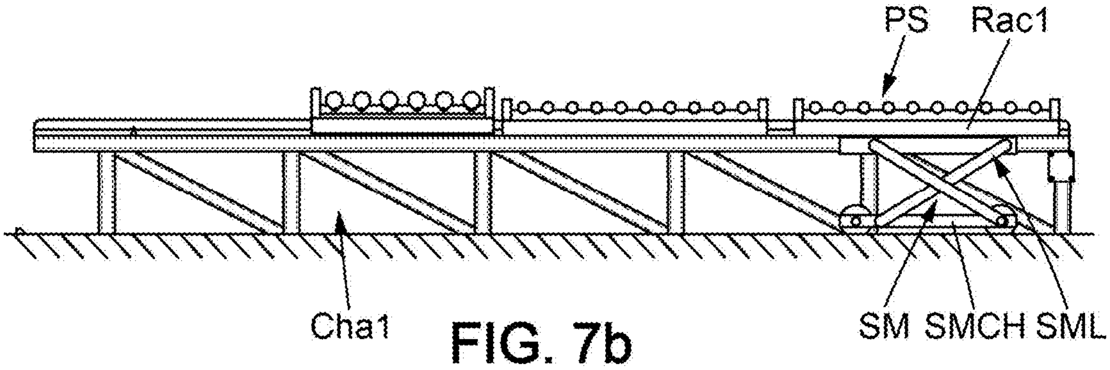

FIG. 7*b* is a view subsequent to FIG. 7*a*, illustrating the rise of the lifting means in particular the rise of a scissor lift until supporting the first rack by the lift.

Figure 7C:
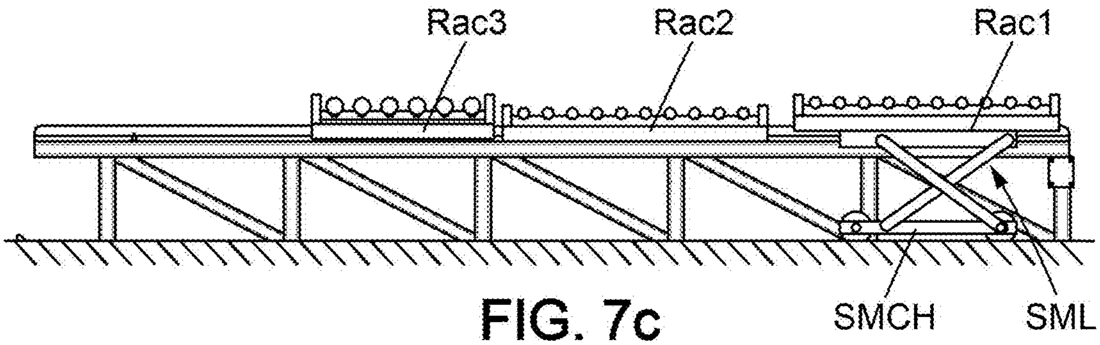

FIG. 7*c* is a view subsequent to FIG. 7*b*, illustrating, after carrying on the rise of the first rack, the loss of contact between, on the one hand, the second projecting portions, secured to the first rack and, on the other hand, the first projecting portions secured to the support frame.

Figure 7D:
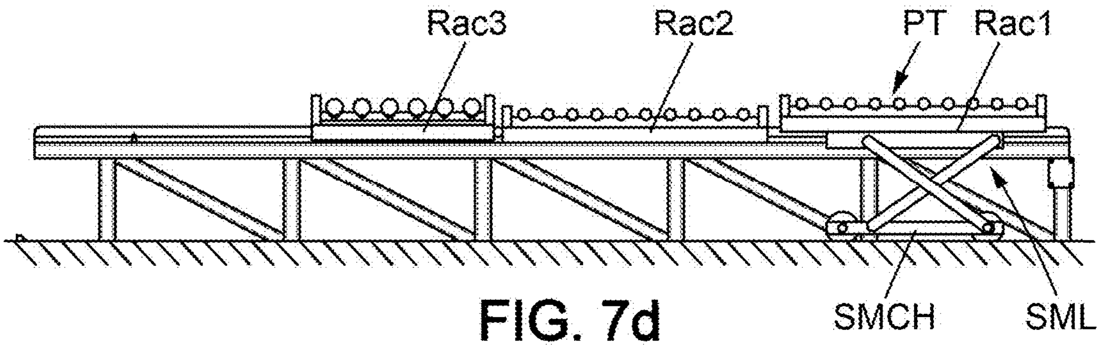

FIG. 7*d* is a view subsequent to FIG. 7*c*, for which the first rack is moved by the motor-driven handling system in order to shift the vertical alignment between the second projecting portions of the first rack and the first portions up to a transport position enabling the descent of the first rack in the free clearance.

Figure 7E:
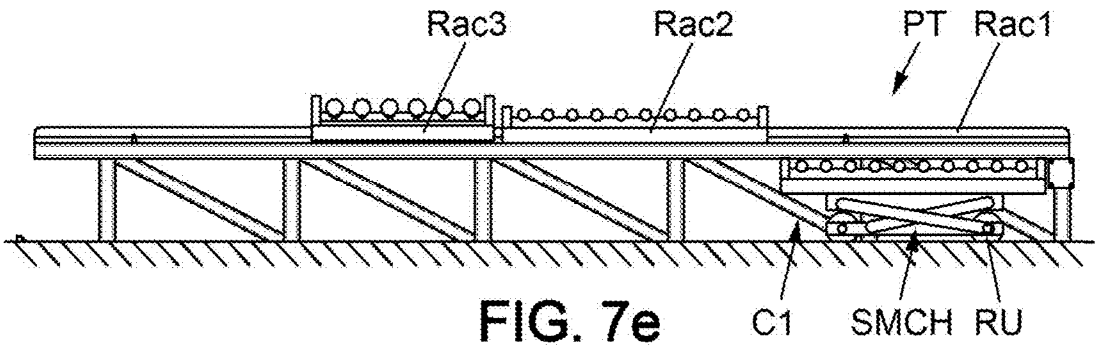

FIG. 7*e* is a view subsequent to FIG. 7*c*, illustrating the descent of lifting means down to a lowered position of the first rack at a level in the free clearance enabling circulation below the racks resting on the support frame at the intermediate position, starting from a first side of the second rack.

Figure 7F:
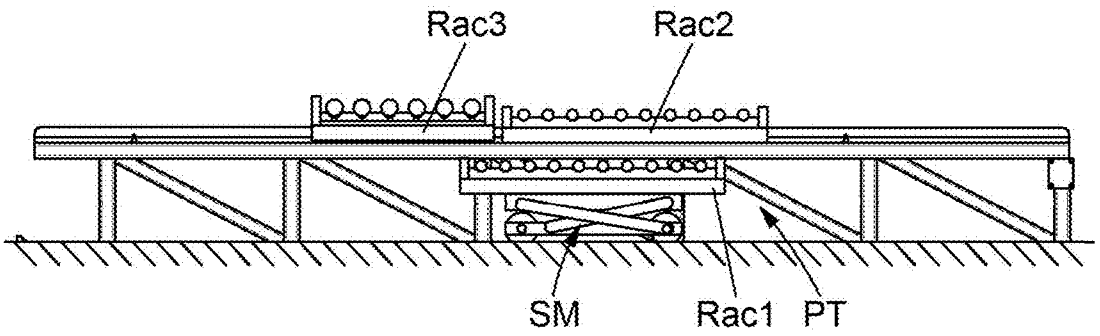

FIG. 7*f* is a view subsequent to FIG. 7*e* for which the handling system and the supported first rack at the lowered position circulate below the second rack resting bearing on the support frame.

Figure 7G:
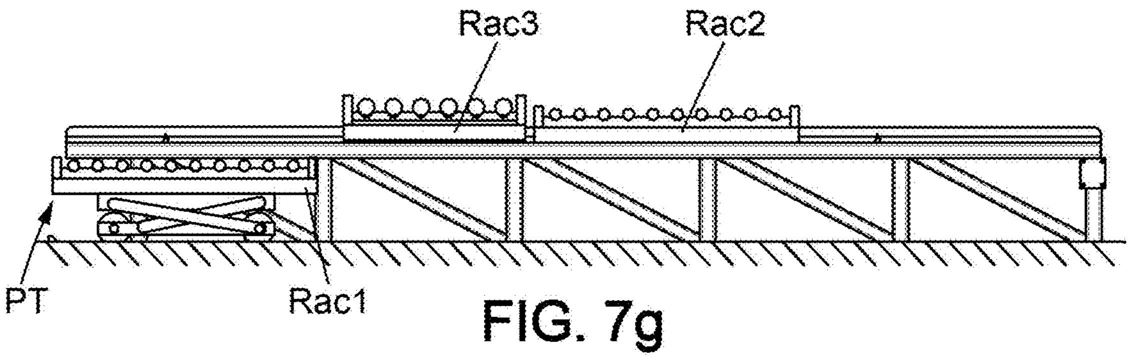

FIG. 7*g* is a view subsequent to FIG. 7*f* for which the handling system is located at the distal section of the support frame.

Figure 7H:
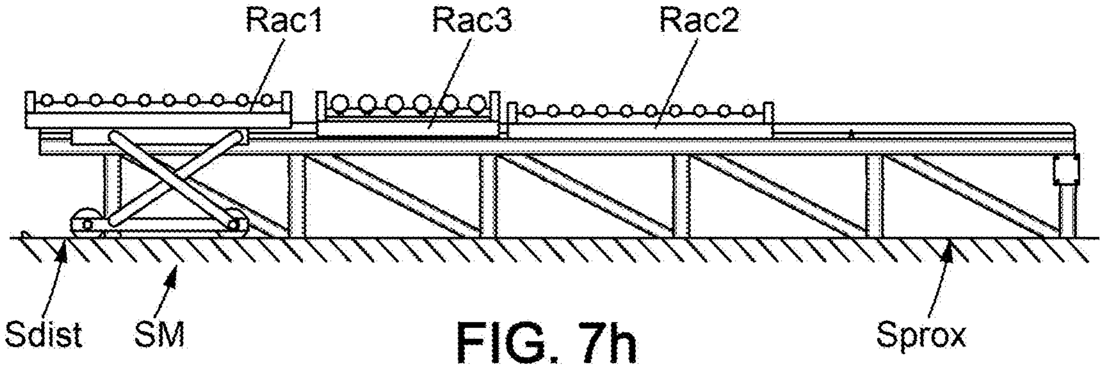

FIG. 7*h* is a view subsequent to FIG. 7*g* for which the lifting means of the handling system lift the first rack, the first projecting positions of the frame over the distal section of the rack, out of vertical alignment with second portions of the first rack, according to a shift along the longitudinal direction of the support frame, up to a height position of the first rack above the first projecting portions.

Figure 7I:
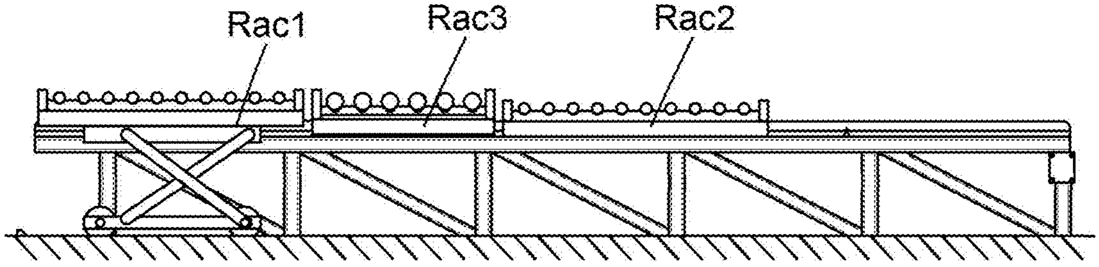

FIG. 7*i* is a view subsequent to FIG. 7*h* for which the handling system moves the first rack in order to vertically align the second projecting portions of the first rack with the first projecting portions of the support frame at the distal section.

Figure 7J:
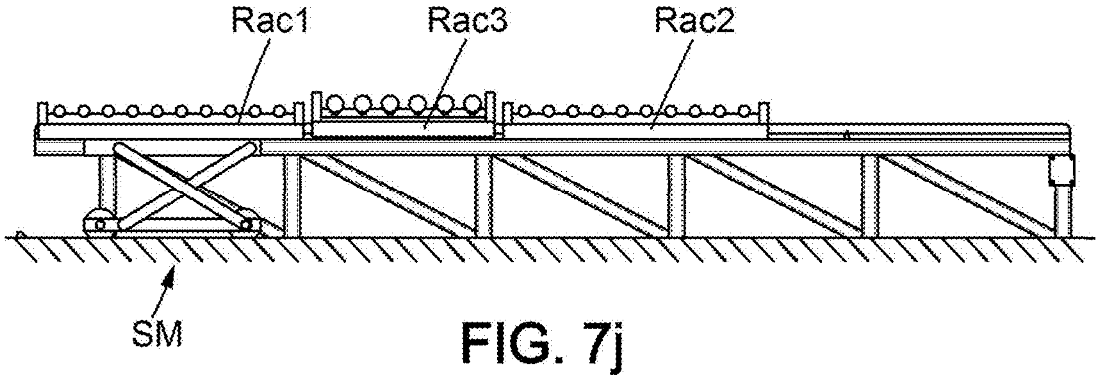

FIG. 7*j* is a view subsequent to FIG. 7*h* for which the lifting means of the handling system lower the first rack in order to deposit the first rack on the support frame, the second projecting portions of the first rack rest on the first projecting portions of the support frame.

Figure 7K:
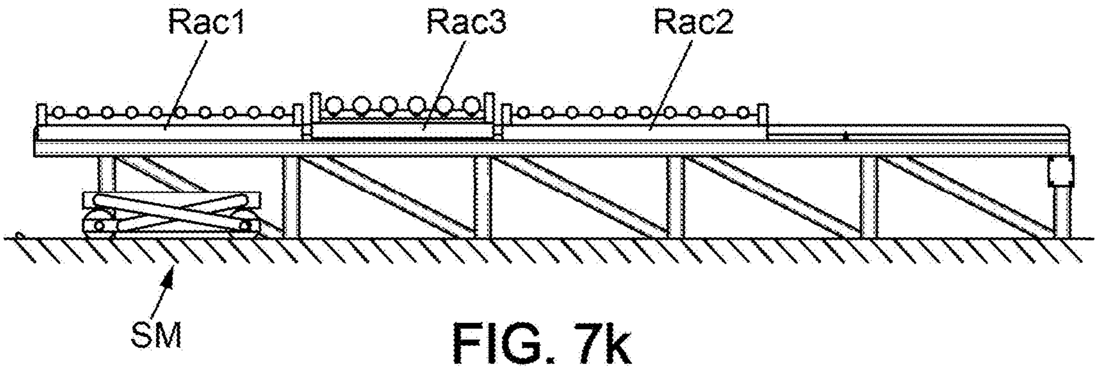

FIG. 7*k* is a view subsequent to FIG. 7*j* for which the lifting means, in particular the scissor lift table is retracted/lowered, in order to enable the movement of the handling system towards the proximal section.

Figure 7L:
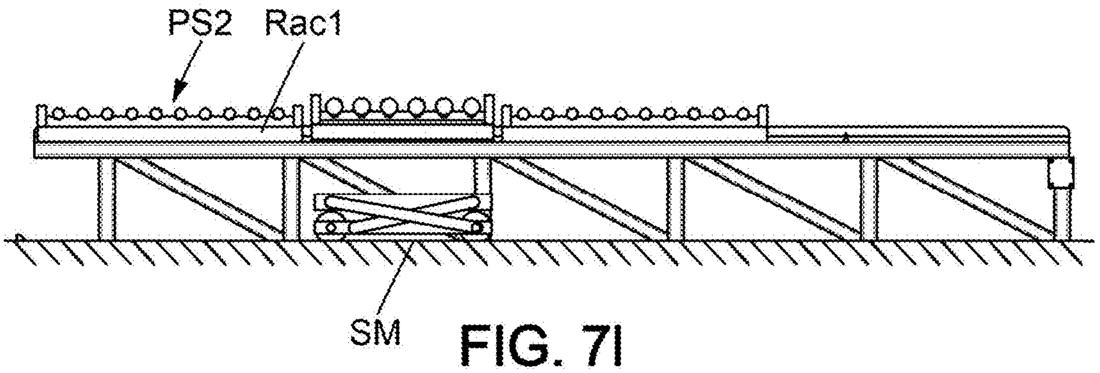

FIG. 7*l* is a view subsequent to FIG. 7*k* for which the handling system is moved up to a position clearing the free clearance at the distal section of the support frame, clearing an access for an extraction of the first rack resting on the distal section.

Figure 7M:
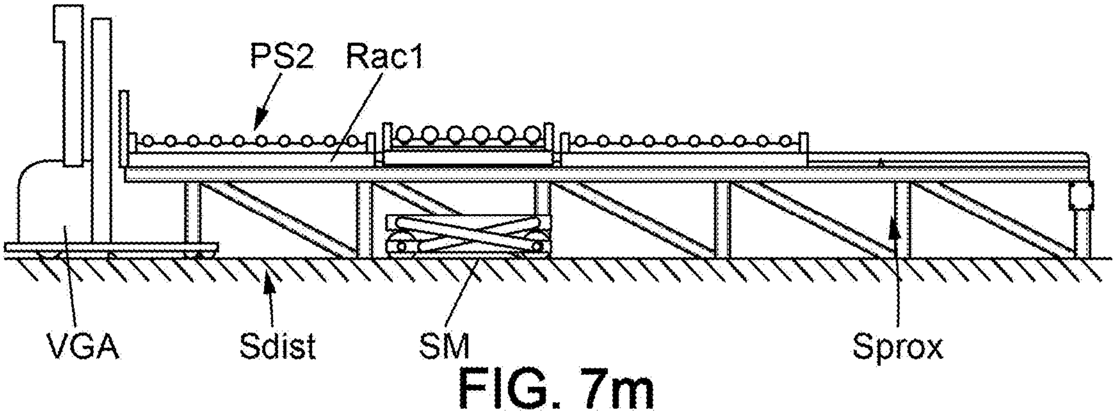

FIG. 7*m* is a view subsequent to FIG. 7*l* for which an automated guided vehicle is inserted from an opening at the distal end of the support frame, into the free clearance below the first rack for the evacuation of the first rack.

Figure 8:
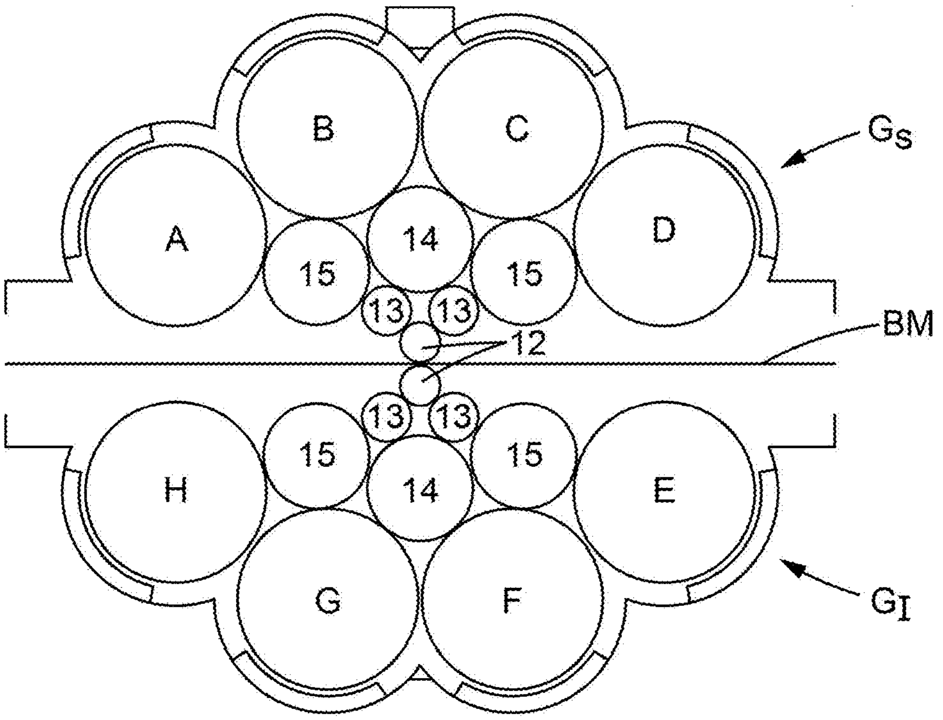

FIG. 8 is a view of a 20Hi-roller arrangement.

DETAILED DESCRIPTION

The present disclosure relates to a rack system SR for the storage of rolls of a rolling mill comprising a support frame Cha configured to support several racks Rac, distributed over the length of the support frame Cha, at different positions along the length of the rack.

The support frame Cha comprises a first support Cha1 and a second support Cha2, respectively fastened to the ground in parallel, oriented along the lengthwise direction of the support frame Ch. The first support Cha1 and the second support Cha2 leaving a free clearance IT therebetween, the free clearance arranged below the level of the racks bearing on the support frame Cha.

The rack system comprises several racks comprising at least one first rack Ra1 and one second rack Ra2 configured to rest bearing on the support frame Cha, simultaneously resting on the first support Cha1 and the second support Cha2.

The first rack Ra1 rests on the support frame, at two opposite edges of the first rack Rac1, at two positions over the length of the first rack, the two edges respectively bearing on the first support Cha1 and the second support Ch2.

The second rack Ra2 rests on the support frame, at two opposite edges of the second rack Rac2 at two positions over the length of the second Rac2, said second rack Rac2 arranged at an intermediate position over said support frame Cha along the length of the support frame Cha.

In general, and as illustrated in FIG. 3, the rack system SR according to the present disclosure finds particular application in a plant for rolling a metal strip comprising a rolling mill L, and such a rack system SR.

Said rolling mill has a roll stand and a set of rolls, internal to the roll stand, including two work rolls 12, backup rolls or sets of backup rollers A, B, C, D, E, F, G, H, and possibly intermediate rolls, in particular first intermediate rolls 13 and second intermediate rolls 14, 15.

Typically, the rolling mill may be a 20-high rolling mill, comprising:

- an upper group $G_S$ comprising an upper work roll 12, two first intermediate rolls 13, three second intermediate rolls 14, 15 (two of the second intermediate rolls 15 respectively bearing through two contact generatrices on the two first intermediate rolls 13, and the third one, interposed therebetween, bearing on the two first intermediate rolls 13 through two contact generatrices) and four rolls (or sets of backup rollers) A, B, C, D,
- an upper group $G_I$ comprising a lower work roll 12, two first intermediate rolls 13, three second intermediate rolls 14, 15 (two of the second intermediate rolls 15 respectively bearing through two contact generatrices on the two first intermediate rolls 13, and the third one, interposed therebetween, bearing on the two first intermediate rolls 13 through two contact generatrices) and four rolls (or sets of backup rollers) E, F, G, H.

The roll stand has an access opening, possibly closed by a door system. The metal strip Bm extends longitudinally along a horizontal direction X, and transversely according to a horizontal direction Y, the direction Y being parallel to the axes of the rolls of the rolling mill.

The plant comprises a robotic system 1 suited to ensure the operations of replacing rolls of the rolling mill, by extraction of the worn rolls from the roll stand and/or insertion of new or rectified rolls into the roll stand.

The robotic system comprises a robot Ro comprising a carriage comprising a frame 2 provided with wheels cooperating with rails Ra1 disposed on the ground, extending along the direction Y, in line with the access opening of the roll stand, said frame being configured to move along the direction Y along the rails Ra1, and a grasping system configured to control locking and unlocking of grasping of an endpiece Eb secured to a roll, or else grasping of an endpiece of a gripping system of a roll of the rolling mill.

The support frame Cha of the rack system is fastened to the ground at an anchor position at a distance from the rolling mill according to the transverse direction Y and laterally to the rails Ra1, clearing a maintenance aisle AL extending along the direction X parallel to the metal strip, along the access opening of the rolling mill, the support frame Cha including the first support Cha1, the second support Cha2 and the free clearance IT oriented lengthwise along the transverse direction Y, laterally to the rails Ra1.

The robotic system 1 is configured to ensure the extraction of a roll, typically worn, for example a work roll 12, by grasping the endpiece secured to the roll, or else by grasping the roll by the locked gripping system by the grasping system, with the deposition of the roll, laterally to the rails Ra1 on the first rack Rac1 bearing on the support frame Cha. Conversely, the robotic system may allow grasping a new (or rectified) roll on the first rack and inserting it into the roll stand.

The first rack Rac1 on which the robotic system 1 deposits or extracts the rolls, in particular the work rolls 12 is preferably arranged over the proximal section Sprox of the support frame Cha, the closest to the roll stand, which is opposite to the distal section Sdist, the farthest (from the rolling mill) from which the racks are fed or extracted typically by an automated guided vehicle AGV.

In particular, and according to the rack system SR according to the present disclosure, at least said first rack Ra1 is configured to pass from a storage position PS for which said first rack Rac1 rests bearing simultaneously on the first support Cha1 and the second support Ch2 up to a transport position PT for which the first rack Rac1 is configured to be stowed in the free clearance IT, below the level of the second rack Rac2 resting on said support frame Cha at the intermediate position.

The rack system SR also comprises a motor-driven handling system SM, configured to move in said free clearance IT between the first support Cha1 and the second support Cha2 and along the length of the latter.

The handling system SM comprises:

- a frame SMCH provided with drive means configured to circulate in the free clearance between the first support Cha and the second support Cha2, along the length of the support frame Cha, and in particular according to an amplitude starting from the proximal section Sprox of the support frame Cha up to the distal section Sdist of the support frame Cha,
- lifting means SML configured to ensure support at least of the first rack Rac1 in said transport position PT.

Typically, the drive means comprise means for trolleying the handling system comprising rails RSM, arranged along the length of the free clearance IT and wheels of the frame CHSM, typically motor-driven, configured to circulate along the rails while being guided by the rails. The lifting means SM may comprise a scissor lift.

The handling system SM is configured to ensure, starting from said storage position PS of the first rack Rac1 simultaneously bearing on the first support Cha1 and the second support Cha2, in particular on the proximal section Sprox of the support frame Cha, the following steps:

- /a/a passage of the first rack Rac1 into said transport position PT of the first rack Rac1, enabling stowage thereof in the free clearance IT, as illustrated in FIG. 7*d*
- /b/a descent of the first rack Rac1 in the free clearance IT between the first support Cha1 and the second support Cha2, in a lowered position below the level of the second rack Rac2 resting on the support frame Ch at said intermediate position, as illustrated in FIG. 7*e*, and
- /c/a joint movement of the handling system SM and of said first rack Rac1 supported by the lifting means SML in the lowered position of the first rack, through a movement of the handling system along the length of the frame so as to move the first rack Rac1 below the second rack Rac2 resting on the support frame Cha at said intermediate position, starting from a first side C1 of the second rack Rac2 and up to an opposite second side C2, as illustrated in FIGS. 7*f*, 7*g*.

Following step/c/, the handling system SM may be configured to also ensure:

- /d/the rise of the first rack above the free clearance Int, as illustrated in FIG. 7*h,*
- /e/the passage of the first rack Rac1, from the transport position PT of the first rack up to a second storage position PS2 the first rack resting on the frame, on the distal section Sdist of the frame, opposite to the proximal section Sprox of the frame, and as illustrated in FIG. 7*j*.

The rolling plant may comprise at least one an automated guided vehicle AGV configured to be inserted between the first support Cha1 and the second support Cha2 at the distal section Sdist of the support frame, the automated guided vehicle configured to remove or feed the support frame Cha1 with racks, including extracting the first rack Rac1 resting in said second storage position PS2.

Typically, the lifting means are retracted afterwards, to enable the movement of the handling system SM, towards the proximal section Sprox, and in order to clear the free clearance IT at the level of the proximal section Sprox, and as illustrated according to the direction of movement of the arrow in FIG. 7*k* and according to a step/f/. Once the handling system SM has been moved and thus the free clearance cleared at the level of the distal section Sdist (FIG. 7*l*), the first rack Rac1 can be evacuated, typically by an automated guided vehicle AGV by insertion thereof from an opening between the first support Cha1 and the second support Cha2, at the level of the proximal section Sdist (FIG. 7*m*).

In general, the handling system is provided with a motor/actuator and in particular the drive means for example for driving one or more wheels, and the lifting means for actuating the rise and the descent.

In general, the sequence implemented for the handling system may be implemented by an automaton which comprises a processor and a memory containing instructions for the implementation of steps/a/to/e/, and possibly/f/.

In general, and as illustrated for indicative purposes in the figures, in particular in FIGS. 5, 6 and 6*a*, the support frame Cha may comprise first support portions POS1, projecting from the first support Cha1 and from the second support Ch2 directed inwardly of the free clearance IT, the first support portions POS1 locally distributed along the length of the support frame Cha.

The first support portions POS1 projecting from the first support Cha1 and projecting from the second support Cha2, may project respectively from a longitudinal frame member of the first support Cha1 and from a longitudinal frame member of the second support Cha2.

The first rack Rac1 then comprises second support portions POS2, projecting from the first rack Rac1 outwardly, the second support portions POS2, locally distributed along a dimension of the first rack Rac1, on both sides of the first rack Rac1.

The storage position PS is then obtained by pressing the second projecting portions POS2 of the first rack Rac1 on the first projecting portions POS1 of the support frame Cha, as illustrated in FIGS. 6 and 6*a*.

The transport position PT is obtained by lifting the first rack Rac1 from the storage position PS (cf. for example FIG. 7*c*) and through a movement of the first rack Rac1 along the support frame Cha, by the handling system SM so as to shift the vertical alignment between the second support portions POS2 and the first support portions POS1 (cf. for example FIG. 7*d*). Typically, the movement ensuring shifting of the vertical alignment is a movement, shorter than the dimension of the first rack along the longitudinal direction of the support frame, and typically shorter than half, and possibly shorter than the quarter of the dimension of the first rack along the longitudinal direction of the support frame Cha, and as shown in FIGS. 7*c* and 7*c*.

Typically, the rack system SR may comprise a plurality of pairs of first projecting portions POS1 along the length of the support frame Cha, enabling support of the first rack Rac1 in said storage position PS, at several discontinuous positions along the length of the support frame Cha, and typically at the level of the proximal section Sprox of the support frame Cha and the proximal section of the support frame.

At least according to an embodiment illustrated in particular in the figures, one could notice that the support frame Cha comprises pairs of projecting portions, enabling support of the second rack Rac2, juxtaposed to the first rack Rac1 then arranged at the level of the proximal section.

For example and according to the illustrated example, the pairs allow positioning the first rack Rac1 on the proximal section Sprox, a second rack Rac2 arranged contiguously to the first rack, the second rack comprising, like the first rack Rac1, second projecting portions POS2 bearing on the first projecting portions POS1.

According to one embodiment, said at least one first rack Rac1 can support rolling work rolls 12, for example, preferably the rolls being parallel to each other, oriented for example perpendicularly to the longitudinal direction of the support frame Cha.

The widthwise dimension of the support frame is such that the first rack Rac1 and the work rolls 12 supported by the first rack Rac1 could be stowed in the free clearance IT, in particular during steps /b/, /c/ and /d/.

The other racks, in particular the second rack Rac2 and/possibly the third rack Rac3 may be similar to the first rack, comprising the second projecting portions and be evacuated according to the same sequence as the first rack Rac1, by said handling system. Alternatively, the other racks, in particular the third rack Rac3, may be different from the first rack. In particular, it may consist of a rack with a larger dimension, so as to be supported bearing on the longitudinal frame members of the first and second supports Cha1 and Cha2, and without being able to be stowed in the free clearance IT.

For example, in the figures, the third rack Rac3 allows receiving first intermediate rolls.

Advantageously, and in comparison with the prior art, the rack system according to the present disclosure allows evacuating the first rack Rac1 on the proximal section Sprox of the support frame Cha, close to the rolling mill, without having to remove beforehand the second rack Rac2, and possibly a third rack Rac3 arranged juxtaposed at the intermediate position of the support frame, in particular as illustrated in the sequence of FIGS. 7*a* to 7*m*, thanks to the handling system SM which ensures the transport of the first rack Rac1 in the free clearance IT, below the racks Rac2 and Rac3, and until deposition of the first rack on the free distal section Sdist of the rack, from which the first rack and the worn work rolls 12 could be extracted, typically by the automated guided vehicle AGV.

Thus, in general, the present disclosure also relates to a method for evacuating worn rolls implemented by a rack system according to the present disclosure, or belonging to a rolling plant according to the present disclosure, the first rack Rac1 carrying worn work rolls 12 resting on the support frame Cha, over a proximal section Sprox of the length of the support frame, close to a roll stand L, the proximal section being opposite to a distal section Sdist of the length of the support frame, and wherein the handling system SM is configured to ensure, starting from said storage position PS of the first rack Rac1 simultaneously bearing on the first support Cha1 and the second support Cha2, the first rack Rac1 bearing on the proximal length section Sprox, the following steps:

/a/passage of the first rack Rac1 into said transport position PT of the first rack, enabling stowage thereof in the free clearance IT, /b/descent of the first rack Rac1 in the free clearance between the first support Cha1 and the second support Cha2, in a lowered position below the level of the second rack Rac2 resting on the support frame at said intermediate position, and /c/joint movement of the handling system SM and of said first rack Rac1 supported by the lifting means in the lowered position of the first rack Rac1, through a movement of the handling system SM along the length of the frame so as to move the first rack, below the second rack Rac2 resting at said intermediate position, starting from a first side C1 of the second rack and up to an opposite second side C2, up to the distal section of the support frame, /d/rise of the frame above the free clearance, /e/passage of the first rack Rac1 from the transport position PT of the first rack up to a second storage position PS2, the first rack Rac1 resting on the frame, on the distal section Sdist, opposite to the proximal section Sprox of the frame.

Afterwards, the first rack Rac1 is evacuated from the distal section Sdist of the support frame, in particular by an automated guided vehicle AGV.

Conversely, advantageously in comparison with the prior art, the rack system according to the present disclosure allows feeding a first rack Rac1 on the distal section, in particular loaded with new or rectified work rolls and transferring it onto the proximal section of the support frame, close to the rolling mill, without having to remove beforehand the second rack Rac2, and possibly a third one disposed beforehand at one/several intermediate position(s) of the support frame, namely between the distal section and the proximal section, and advantageously thanks to the handling system which ensures the transport of the first rack Rac1 and of the work rolls 12 supported by the first rack, through the free clearance IT, and according to a movement path running below the racks Rac2, Rac3, and until deposition thereof on the free proximal section of the rack.

Thus, and in general, the present disclosure also relates to a method for feeding new (or rectified) rolls implemented by a rack system according to the present disclosure, or belonging to a plant according to the present disclosure, wherein a distal section Sdist of the length of the support frame opposite to a proximal section Sprox of the length of the support frame, close to a roll stand, is fed with a first rack Rac carrying new (or rectified) work rolls 12, typically by an automated guided vehicle AGV, and wherein the handling system is configured to ensure, starting from a storage position of the first rack simultaneously bearing on the first support Cha1 and the second support Cha2, said first rack Rac1 bearing on the distal section Sdist, the following steps:

/a1/ passage of the first rack Rac1 into said transport position PT of the first rack Ra1, enabling stowage thereof in the free clearance IT, /b1/ descent of the first support Cha1 in the free clearance IT between the first support Cha1 and the second support Cha2, in a lowered position below the level of the second rack Rac2 resting on the support frame Cha at said intermediate position, and /c1/ joint movement of the handling system SM and of said first rack Rac1 supported by the lifting means SML in the lowered position, through a movement of the handling system SM along the length of the frame so as to move the first rack Rac1, below the second rack Rac2 resting at said intermediate position, starting from a first side of the second rack Rac2 and up to an opposite second side, and up to the proximal section of the support frame, /d1/ rise of the first rack Rac1 above the free clearance, /e1/ passage of the first rack Rac1 from the transport position PT of the first rack Rac1 up to a second storage position, the first rack Rac1 resting on the support frame Cha, on the proximal section Sprox, opposite to the distal section Sdist of the support frame.

Wherever possible, the storage system according to the present disclosure allows disposing a first rack Rac1 and a second rack Rac2, sill on said proximal section, or immediately proximate to the proximal section of the support frame, close to the rolling mill (in comparison with the distal section), one of the racks being able to receive new (or rectified) work rolls 12 to be fed into the roll stand, the other rack intended to receive or receiving the worn work rolls 12.

As regards the work rolls 12, which require a higher frequency of replacement than the other rolls, in particular the first intermediate rolls 13 or the second intermediate rolls 14, 15, or backup rolls A to H, the robotic system allows depositing or recovering the work rolls 12 from the area of the support frame the closest to the rolling mill, and not from the farthest distal section, even when the frequency of passage of the guided vehicles is low. Advantageously, the movement strokes of the robotic system along the rails Ra1 during the roll replacement operations are limited. Thus, it is possible to reduce the roll replacement cycle time in comparison with the prior art introduced in the introduction disclosed by WO 2022/229327A1 in case of under-capacity of the automated guided vehicles.

LIST OF THE REFERENCE SIGNS

L. Rolling mill,
1. Robotic system,
2 Frame
Ro. Robot,
Ra1. Rail along the direction Y
AL. Maintenance aisle (between the roll stand of the rolling mill and the support frame of the rack, oriented along a direction parallel to the strip to be rolled),
SR. Rack system,
Rac. Rack,
Rac1, Rac2, Rac3. Respectively, first rack, second rack and third rack,
Cha. Support frame,
Cha1, Cha2. First support and second support (support frame),
IT. Free clearance (between the first support and the second support),
Sprox. Proximal section (Support frame),
Sdist. Distal section (Support frame),
Cha1, Cha2. First support and second support
POS1, POS2. First projecting portions and second projecting portions,
PS, PS2. Storage positions (first rack)
PT. Transport position,
SM. Motor-driven handling system,
SMCH. Frame
SML Lifting means,
RSM. Rails (Handling system)
20-high rolling mill arrangement (FIG. 8),
Gi, Gs. Respectively upper group and lower group,
12. Work rolls,
13. First intermediate rolls,
14, 15. Second intermediate rolls,
A, B, C, D. respectively the four backup rolls or sets of backup rollers of the upper group,
E, F, G, H. respectively the four backup rolls or sets of backup rollers of the lower group.

The invention claimed is:

1. A rack system (SR) for the storage of rolls of a rolling mill comprising:

a support frame (Cha) configured to support several racks (Rac), distributed over the length of the support frame at different positions along the length of the rack, the support frame (Cha) comprising a first support (Cha1), and a second support (Cha2), respectively fastened to the ground in parallel, the first support (Cha1) and the second support (Cha2) leaving a free clearance (IT) therebetween, arranged below the level of the racks bearing on the support frame (Cha), at least one first rack (Ra1) and one second rack (Ra2) configured to rest by bearing on the support frame Cha, by resting simultaneously on the first support (Cha1) and the second support (Cha2), at two opposite edges of the first rack (Rac1) at two positions over the length of the first rack and at two opposite edges of the second rack (Rac2) at two positions over the length of the second rack (Rac2), said second rack (Rac2) arranged at an intermediate position on said support frame (Cha) along the length of the support frame (Cha), wherein at least said first rack (Ra1) is configured to pass from a storage position (PS) for which said first rack (Rac1) rests bearing simultaneously on the first support (Cha1) and the second support (Ch2) up to a transport position (PT) for which the first rack (Rac1) is configured to be stowed in the free clearance (IT), below the level of the second rack (Rac2) resting on said support frame (Cha) at the intermediate position, a motor-driven handling system (SM), is configured to move in said free clearance between the first support (Cha1) and the second support (Cha2), said handling system (SM) comprising:

a frame (SMCH) provided with drive means configured to circulate between the first support (Cha1) and the second support (Cha2), along the length of the support frame, lifting means (SML) configured to ensure the support of at least the first rack (Rac1) in said transport position (PT), and wherein said handling system (SM) is configured to ensure, starting from said storage position (PS) of the first rack (Rac1) simultaneously bearing on the first support (Cha1) and the second support (Cha2):

/a/a passage of the first rack (Rac1) into said transport position (PT) of the first rack (Rac1), enabling stowage thereof in the free clearance (IT)

/b/a descent of the first rack (Rac1) in the free clearance (IT) between the first support (Cha1) and the second support (Cha2), in a lowered position below the level of the second rack (Rac2) resting on the support frame (Cha) at said intermediate position, and /c/a joint movement of the handling system (SM) and of said first rack (Rac1) supported by the lifting means (SML) in the lowered position of the first rack, through a movement of the handling system along the length of the frame so as to move the first rack (Rac1) below the second rack (Rac2) resting on the support frame (Cha) at said intermediate position starting from a first side (C1) of the second rack (Rac2) and up to an opposite second side (C2).

2. The rack system according to claim 1, wherein the support frame (Cha) comprises first support portions (POS1), projecting from the first support (Cha1) and from the second support (Ch2) directed inwardly of the free clearance (IT), the first support portions (POS1) locally distributed along the length of the support frame (Cha) and wherein the first rack (Rac1) comprises second support portions (POS2), projecting from the first rack (Rac1) outwardly, the second support portions (POS2) locally distributed along a dimension of the first rack (Rac1) and wherein said storage position (PS) is obtained by pressing the second projecting portions (POS2) of the first rack (Rac1) on the first projecting portions (POS1) of the support frame (Cha), and wherein said transport position (PT) is obtained by lifting the first rack (Rac1) from the storage position (PS) and through a movement of the first rack (Rac1) along the frame by the lifting means of the handling system (SM) so as to shift the vertical alignment between the second support portion (POS2) and the first support portions (POS1).

3. The rack system (SR) according to claim 2, including a plurality of pairs of first projecting portions (POS1) along the length of the support frame (Cha), enabling support of the first rack (Rac1) in said storage position, at several discontinuous positions along the length of the support frame (Cha).

4. The rack system according to claim 1, wherein the drive means comprise means for trolleying the handling system comprising rails (RSM), arranged along the length of the free clearance (IT) and wheels of the frame (CHSM) configured to circulate along the rails (RSM) while being guided by the rails.

5. The rack system according to claim 1, wherein the lifting means (SM) comprise a scissor lift.

6. The rack system according to claim 1, wherein said at least one first rack (Rac1) supports rolling work rolls (12), for example, preferably the rolls being parallel, oriented for example perpendicularly to the longitudinal direction of the support frame (Cha).

7. A plant for rolling a metal strip comprising a rolling mill (L), and a rack system according to claim 1, said rolling mill having a roll stand and a set of rolls, internal to the roll stand, including two work rolls (12), backup rolls or backup rollers (A, B, C, D, E, F, G, H), and possibly intermediate rolls in particular first intermediate rolls (13) and second intermediate rolls (14, 15), the roll stand having an access opening, possibly closed by a door system, the metal strip (Bm) extending longitudinally along a horizontal direction X, and transversely according to a horizontal direction Y, the direction Y being parallel to the axes of the rolls of the rolling mill, said plant comprising a robotic system (1) suited to ensure the operations of replacement of rolls of the rolling mill, by extraction of the worn rolls from the roll stand and/or insertion of new or rectified rolls into the roll stand, said robotic system comprising a robot (Ro) comprising:

a carriage comprising a frame (2) provided with wheels cooperating with rails (Ra1) disposed on the ground, extending along the direction Y, in line with the access opening of the roll stand, said frame being configured to move along the direction Y along the rails (Ra1), and a grasping system (6) configured to control locking and unlocking of grasping of an endpiece (Eb) secured to a roll, or grasping of an endpiece of a gripping system of a roll of the rolling mill, and wherein said support frame (Cha) is fastened to the ground at an anchor position at a distance from the rolling mill according to the transverse direction Y and laterally to the rails (Ra1), clearing a maintenance aisle (AL) along the direction X, along the access opening of the rolling mill, the support frame (Cha) including the first support (Cha1), the second support (Cha2) and the free clearance (IT) oriented lengthwise along the transverse direction (Y);

and wherein the robotic system (1) is configured to ensure the extraction of a roll, by grasping the endpiece secured to the roll, or by grasping the roll by the locked gripping system by the grasping system, with the deposition of the roll, laterally to the rails (Ra1), on the first rack (Rac1) bearing on the support frame (Cha) in said storage position (PS), the first rack (Rac1) resting on the support frame (Cha), over a proximal section (Spro) of the length of the support frame, opposite to a distal section (Ddist) of the length of the support frame and wherein the handling system (SM) is configured to ensure, starting from said storage position (PS) of the first rack (Rac1) simultaneously bearing on the first support (Cha1) and the second support (Cha2), the first rack bearing on the proximal section (Sprox):

/a/the passage of the first rack (Rac1) into said transport position (PT) of the first rack, enabling stowage thereof in the free clearance (Int), /b/the descent of the first rack (Rac1) in the free clearance between the first support (Cha1) and the second support (Cha2), in a lowered position below the level of the second rack (Rac2) resting on the support frame (Cha) at said intermediate position, and /c/the joint movement of the handling system (SM) and of said first rack (Rac1) supported by the lifting means (SML) in the lowered position of the first rack, through a movement of the handling system (SM) along the length of the frame so as to move the first rack (Rac1) below the second rack (Rac2) resting at said intermediate position, starting from the first side (C1) of the second rack and up to an opposite second side (C2), /d/the rise of the first rack above the free clearance (Int), /e/the passage of the first rack (Rac1) from the transport position (PT) of the first rack up to a second storage position (PS2) the first rack resting on the frame, on the distal section (Sdist) of the frame, opposite to the proximal section (Sprox) of the frame.

8. The plant according to claim 7, comprising an automated guided vehicle (AGV) configured to be inserted into the free clearance between the first support (Cha1) and the second support (Cha2) at the distal section (Sdist) of the support frame, the automated guided vehicle (AGV) configured to remove or feed the support frame (Cha1) with racks, including extracting the first rack (Rac1) resting in said second storage position (PS2).

9. A method for evacuating worn rolls implemented by a rack system according to claim 1, the first rack (Rac1) carrying worn work rolls (12) resting on the support frame (Cha), over a proximal section (Sprox) of the length of the support frame close to a roll stand (L), opposite to a distal section (Sdist) of the length of the support frame, the handling system (SM) is configured to ensure, starting from said storage position (PS) of the first rack (Rac1) simultaneously bearing on the first support (Cha1) and the second support (Cha2), the first rack (Rac1) bearing on the proximal length section (Sprox), the following steps:

/a/passage of the first rack (Rac1) into said transport position (PT) of the first rack, enabling stowage thereof in the free clearance (Int), /b/descent of the first rack (Rac1) in the free clearance between the first support (Cha1) and the second support (Cha2), in a lowered position below the level of the second rack (Rac2) resting on the support frame at said intermediate position, and /c/joint movement of the handling system (SM) and of said first rack (Rac1) supported by the lifting means in the lowered position of the first rack, through a movement of the handling system (SM) along the length of the support frame (Cha) so as to move the first rack (Rac1), below the second rack (Rac2) resting at said intermediate position, starting from a first side (C1) of the second rack and up to an opposite second side (C2), /d/rise of the frame above the free clearance (IT), /e/passage of the first rack (Rac1) from the transport position (PT) of the first rack up to a second storage position (PS2) the first rack resting on the frame, on the distal section (Sdist) opposite to the proximal section (Sprox) of the frame, and wherein the first rack (Rac1) is evacuated from the distal section (Sdist) of the support frame (Cha), in particular by an automated guided vehicle (AGV).

10. A method for feeding new or rectified rolls implemented by a rack system according to claim 1, wherein a distal section (Sdist) of the length of the support frame, opposite to a proximal section (Sprox) of the length of the support frame, close to a roll stand, is fed with a first rack (Rac1) carrying new or rectified work rolls (12), and wherein the handling system is configured to ensure, starting from a storage position of the first rack simultaneously bearing on the first support (Cha1) and the second support (Cha2), said first rack (Rac1) bearing on the distal section (Sdist), the following steps:

passage of the first rack (Rac1) into said transport position (PT) of the first rack (Ra1), enabling stowage thereof in the free clearance (IT), descent of the first support (Cha1) in the free clearance (IT) between the first support (Cha1) and the second support (Cha2), in a lowered position below the level of the second rack (Rac2) resting on the support frame (Cha) at said intermediate position, and joint movement of the handling system (SM) and of said first rack (Rac1) supported by the lifting means (SML) in the lowered position, through a movement of the handling system (SM) along the length of the frame so as to move the first rack (Rac1), below the second rack (Rac2) resting at said intermediate position, starting from a first side of the second rack (Rac2) and up to an opposite second side, rise of the first rack (Rac1) above the free clearance, passage of the first rack (Rac1) from the transport position (PT) of the first rack (Rac1) up to a second storage position, the first rack (Rac1) resting on the support frame (Cha), on the proximal section (Sprox), opposite to the distal section (Sdist) of the support frame.

* * * * *